United States Patent
Ichio et al.

(10) Patent No.: US 8,662,910 B2
(45) Date of Patent: Mar. 4, 2014

(54) VEHICLE-SIDE CONNECTOR

(75) Inventors: Toshifumi Ichio, Yokkaichi (JP); Akinori Takada, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 62 days.

(21) Appl. No.: 13/467,266

(22) Filed: May 9, 2012

(65) Prior Publication Data

US 2012/0295460 A1 Nov. 22, 2012

(30) Foreign Application Priority Data

May 17, 2011 (JP) ................................. 2011-110686

(51) Int. Cl.
*H01R 13/73* (2006.01)
(52) U.S. Cl.
USPC ......................................................... 439/206
(58) Field of Classification Search
USPC .................................................. 439/206, 205
See application file for complete search history.

(56) References Cited

U.S. PATENT DOCUMENTS

| | | | |
|---|---|---|---|
| 4,793,819 A * | 12/1988 | Berg ............................. | 439/142 |
| 5,350,312 A | 9/1994 | Kuno et al. | |
| 5,800,188 A * | 9/1998 | Barber et al. ................. | 439/142 |
| 5,816,643 A | 10/1998 | Itou et al. | |
| 5,860,822 A * | 1/1999 | Nishide et al. ............... | 439/206 |
| 5,924,893 A * | 7/1999 | Eidsvig ........................ | 439/551 |
| 6,375,500 B1 | 4/2002 | Murakami et al. | |
| 7,775,807 B2 * | 8/2010 | Yamaguchi et al. ......... | 439/76.2 |
| 7,794,276 B2 * | 9/2010 | Shigeta et al. ............... | 439/588 |
| 7,950,930 B2 * | 5/2011 | Yoshida et al. .............. | 439/76.2 |
| 8,075,325 B1 * | 12/2011 | Kao et al. ..................... | 439/205 |
| 8,079,857 B2 * | 12/2011 | Zhu .............................. | 439/205 |
| 8,257,101 B2 * | 9/2012 | Ichio ............................ | 439/206 |
| 2002/0037659 A1 * | 3/2002 | Yuasa .......................... | 439/206 |
| 2010/0112841 A1 | 5/2010 | Yong | |

FOREIGN PATENT DOCUMENTS

JP 729631 1/1995

* cited by examiner

*Primary Examiner* — Gary F. Paumen
(74) *Attorney, Agent, or Firm* — Gerald E. Hespos; Michael J. Porco; Matthew T. Hespos

(57) ABSTRACT

A vehicle-side connector (10) includes a mounting plate (40) fixed to an outer panel (P) of a vehicle. An inner tube (20) penetrates the mounting plate (40). An outer tube (30) surrounds the inner tube (20) and projects from the mounting plate (40) toward the inside of the vehicle. A rubber plug (80) forms a sealed space (33) in the outer tube (30) between wires (W) pulled into the vehicle. A plug presser (90) is mounted in the opening of the outer tube (30) to retain the rubber plug (80). An inclined surface (84) is provided in the sealed space (33) and inclines down toward the outside of the vehicle. A drain channel (32) and a drain port (42) penetrate though the mounting plate (40) and drain water from the drain channel (32) to the outside of the vehicle.

10 Claims, 20 Drawing Sheets

VEHICLE-SIDE CONNECTOR

BACKGROUND OF THE INVENTION

1. Field of the Invention

The invention relates to a vehicle-side connector to be connected to a charging connector at the time of charging.

2. Description of the Related Art

U.S. Pat. No. 5,816,643 discloses a vehicle-side connector to be connected to a charging connector at the time of charging. The vehicle has a body and a housing chamber is provided in the body to face the outside of the vehicle. The vehicle-side connector is housed in the housing chamber. A tapered water guide is provided on the lower surface of the housing chamber and inclines down toward the outside of the vehicle. A downwardly open drain port is provided at a lower end of the water guide and a drain hose is connected to the drain port. Water that enters the housing chamber flows along the water guide and the drain port to the drain hose and is drained to a side below the housing chamber from the drain hose.

However, the drain port is arranged in the housing chamber and the drain hose connected to the drain port is arranged closer to the inside of the vehicle than the body. Thus, a battery may be wetted by water drained from the drain hose in the case of a vehicle type in which the battery is below the housing chamber. Further, a pressure difference is created between the inside of the vehicle and the housing chamber, and the water in the drain hose may flow back to the housing chamber due to this pressure difference.

The invention was completed in view of the above situation and an object thereof is to improve drainage properties of a connector.

SUMMARY OF THE INVENTION

The invention relates to a vehicle-side connector to be connected to a charging connector at the time of charging. The vehicle side connector includes a mounting plate that is to be fixed to a body part of a vehicle. A first tube is provided at the mounting plate and at least partly penetrates through the mounting plate. A second tube projects from the mounting plate toward the inside of the vehicle and has an open projecting end. A resilient plug forms a sealed space in the second tube portion by sealing between a wire pulled into the inside of the vehicle from the interior of the first tube and an opening of the second tube. A plug holder is mounted to the second tube to retain the resilient plug. At least one fluid guide is provided in the sealed space and inclines down toward the outside of the vehicle. At least one drain port penetrates though the mounting plate and drains fluid from the fluid guide to the outside of the vehicle.

According to this configuration, it is possible to form the sealed space in the second tube, bring liquid in this sealed space to the drain port by the liquid guide and drain the liquid to the outside of the vehicle from the drain port by mounting the resilient to the second tube. Further, the sealed space communicates with the atmosphere through the drain port. Thus, the reverse flow of liquid or water from the drain port into the sealed space can be prevented regardless of a pressure variation inside the vehicle.

The second tube preferably surrounds an outer peripheral side of the first tube over the entire circumference to define outer and inner tubes respectively.

The plug holder is mounted in the opening of the second tube to retain the resilient plug.

The vehicle-side connector may further comprise at least one terminal fitting connected to an end of the wire and at least partly accommodated in the inner tube. A retainer is mounted at least partly in an opening of the inner tube to retain the terminal fittings.

The resilient plug may include a base plate formed with at least one seal hole through which the wire is inserted in a sealed state. Thus, the resilient plug can be fixed more easily by arranging the base plate of the resilient plug between the retainer and the plug holder.

The resilient plug may include a peripheral wall standing from the peripheral edge of the base plate. The peripheral wall preferably is tapered.

The fluid guide may be provided from the peripheral wall to the second or outer tube.

A long fluid guide would have to be formed from the opening of the outer tube to the mounting plate if the fluid guide was provided only in the outer tube without providing the resilient plug with the peripheral wall. As a result, the position of the drain port would be farther down and away from the inner tube and the mounting plate would become longer in a downward direction. However, the resilient plug of the invention is provided with the tapered peripheral wall and the fluid guide has the peripheral wall to the outer tube. As a result, the fluid guide in the outer tube can be made shorter. Accordingly, the position of the drain port can be located more upward (closer to the inner tube) and the mounting plate can be made shorter in a vertical direction.

Forward and backward movements of the resilient plug may be prevented by mounting the base plate between the retainer and the plug holder in forward and backward directions without forming any clearance.

The fluid guide may comprise a portion having a tapered shape enlarged down toward the mounting plate.

Fluid that enters a portion of the first tube and reaches the sealed space may be guided obliquely down via one or more drain plates and brought to a drain channel along an inclined surface of the resilient plug and then drained to the outside of the vehicle through the drain port.

These and other objects, features and advantages of the present invention will become more apparent upon reading of the following detailed description of preferred embodiments and accompanying drawings.

DETAILED DESCRIPTION OF THE PREFERRED EMBODIMENTS

An embodiment of the invention is described with reference to FIGS. 1 to 20. A vehicle-side connector 10 in this embodiment is to be connected to a battery (not shown) installed in an electric vehicle, a hybrid vehicle or the like, and is connected to a charging connector (not shown) at the time of charging into the battery. As shown in FIG. 5, the vehicle-side connector 10 includes a housing 11 to be fastened to a body part, such as an outer panel P of the vehicle, by one or more bolts B1. A mounting hole B2 is formed in the outer panel P and the housing 11 is to be mounted and fixed to the outer panel P through this mounting hole B2.

Figure 1:
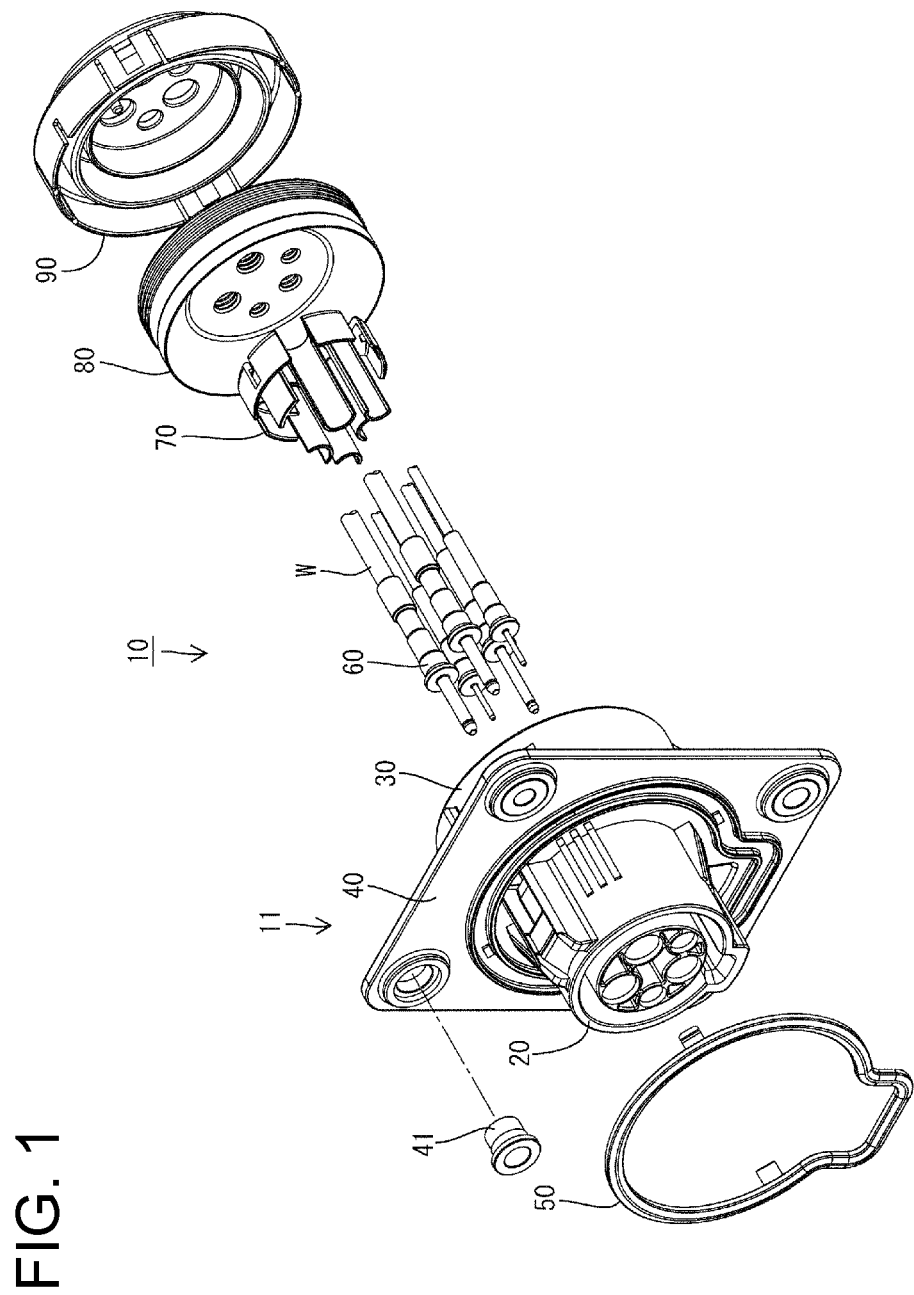
FIG. 1 is an exploded perspective view of a vehicle-side connector in an embodiment of the invention.
Figure 2:
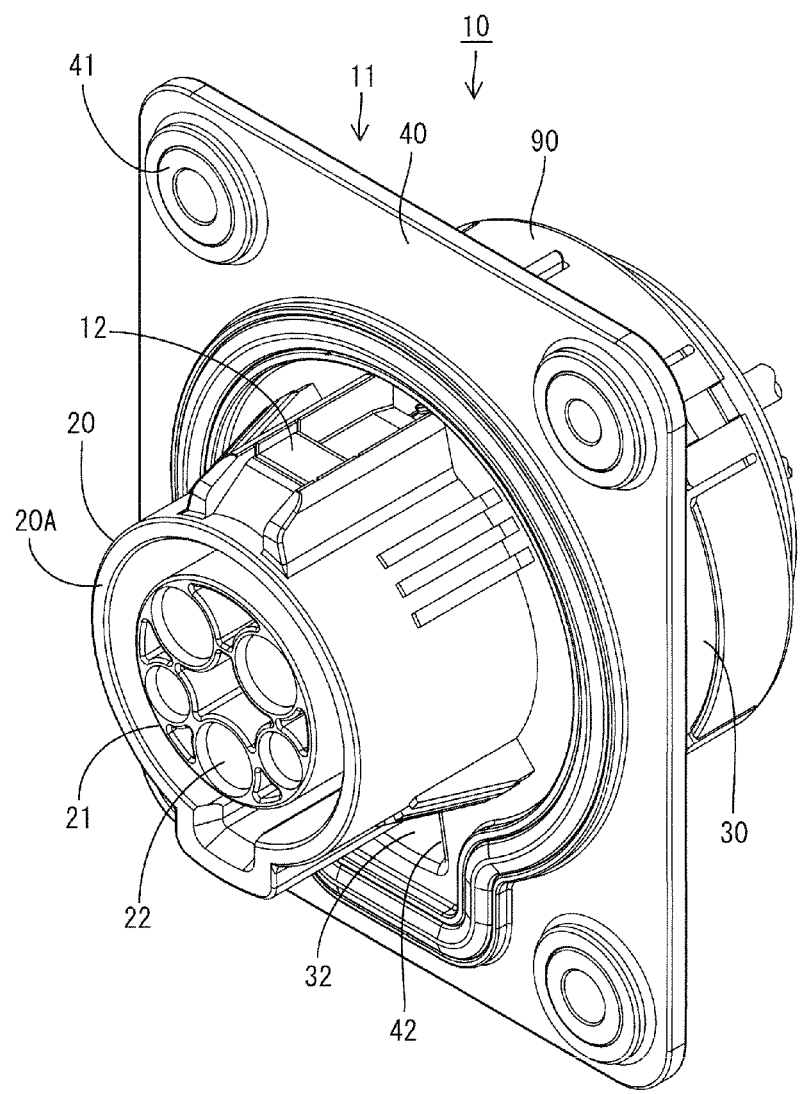
FIG. 2 is a perspective view of the vehicle-side connector.

As shown in FIG. 1, the vehicle-side connector 10 includes the housing 11, a rubber ring 50 to be mounted on the front end of the housing 11, terminal fittings 60 to be accommodated in the housing 11, a retainer 70 to be mounted on rear end the housing 11, a rubber plug 80 to be mounted on the back side of the retainer 70 and a rubber plug presser or holder 90 to be mounted to the housing 11 to hold the rubber plug 80 from the rear.

Figure 7:
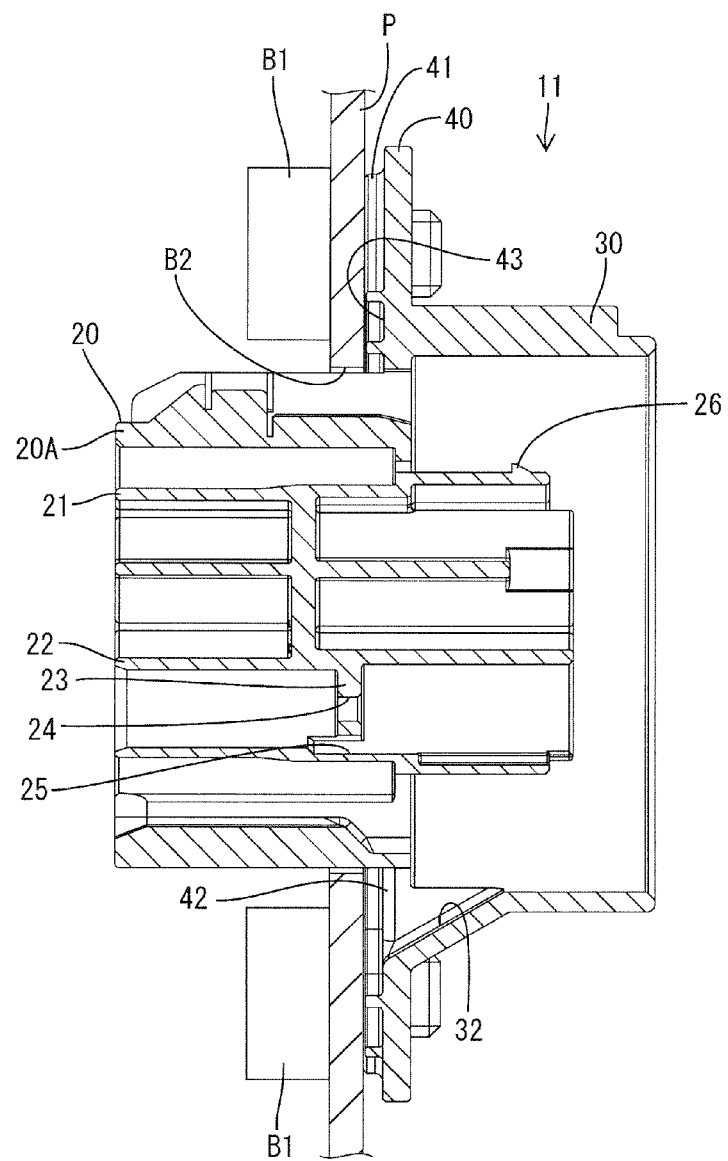
FIG. 7 is a section along A-A of FIG. 6.

The housing 11 is made e.g. of synthetic resin and, as shown in FIG. 7, includes a mounting plate 40 to be fixedly mounted (particularly bolted) to the body part P, an inner tube 20 unitarily formed to the mounting plate 40 in such a manner as to penetrate through the mounting plate 40, and an outer tube 30 surrounding the outer periphery of the inner tube 20 over at least part of the longitudinal extension and over the entire circumference of the first tube 20 in such a manner as to substantially project toward the inside of the vehicle (rear side) from the mounting plate 40 and have an open projecting end. At least one lock 12 is provided on the outer or upper surface of a receptacle 20A of the inner tube 20 to be described later. A lock arm (not shown) provided in the charging connector is engageable with this lock 12, and the charging connector and the vehicle-side connector 10 are held in a connected state to perform charging by the engagement of the lock 12 and the lock arm in forward and backward directions.

The inner tube 20 includes the receptacle 20A having a substantially cylindrical or tubular shape. The receptacle 20A projects forward from the mounting plate 40. A substantially cylindrical or tubular terminal accommodating portion 21 is provided in the receptacle 20A and accommodates terminal fittings 60. The terminal accommodating portion 21 is formed with large and small substantially cylindrical or tubular portions 22 arranged annularly, and the adjacent cylindrical portions 22 are coupled to each other. The terminal accommodating portion 21 and the respective cylindrical portions 22 project in forward and backward directions through the mounting plate 40.

A partition wall 23 for partitioning the internal space into front and rear sides is provided in an intermediate part of each cylindrical portion 22, and a terminal insertion hole 24 is formed in the partition wall 23 for allowing insertion of a terminal connecting portion 61 of the terminal fitting 60. Further, at least one escape hole 25 for allowing water or any other liquid having entered the cylindrical portion 22 from front to escape to the rear side is formed below the terminal insertion hole 24 in the partition wall 23.

Figure 9:
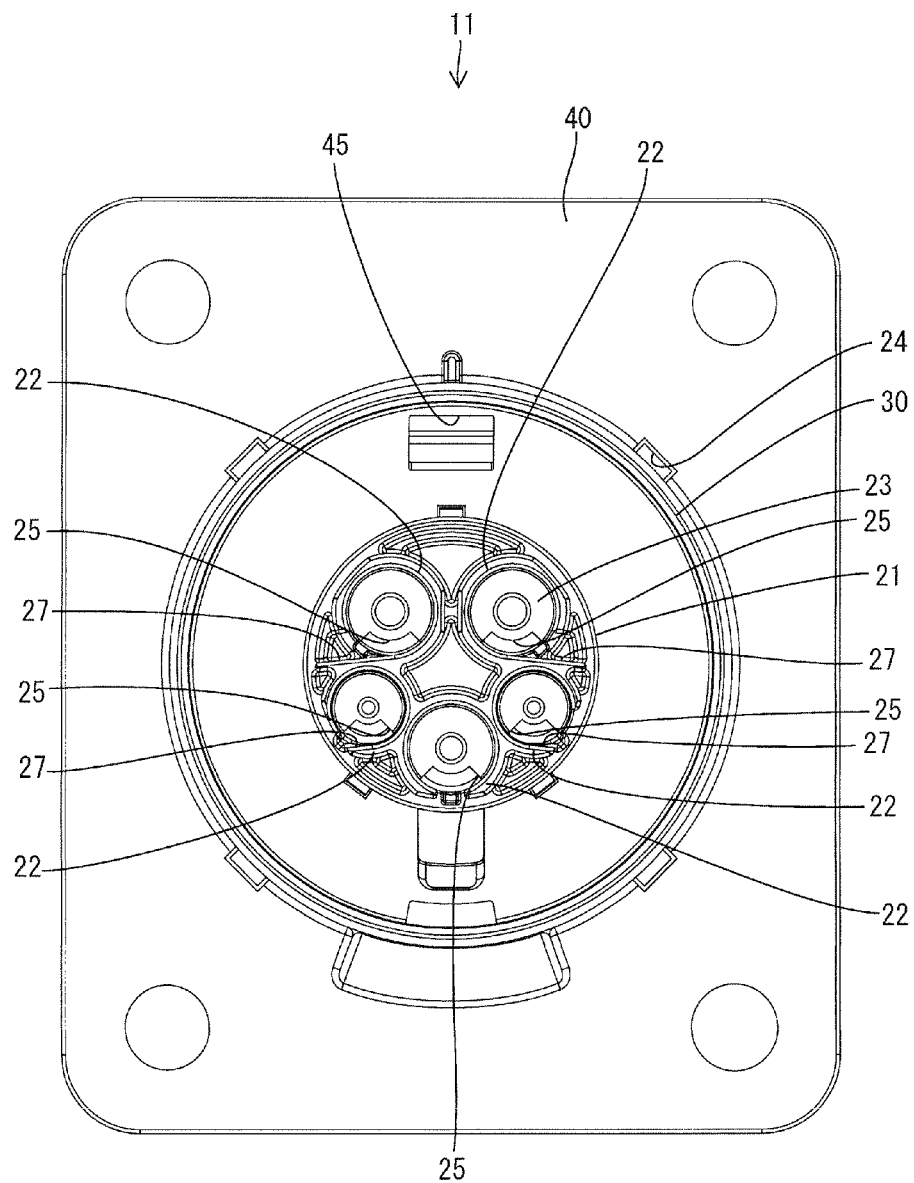
FIG. 9 is a rear view of the housing.

As shown in FIG. 9, a drain plate 27 in the form of a downwardly inclined substantially flat plate is connected to the lower side of each cylindrical portion 22 behind the mounting plate 40. This drain plate 27 is connected to the outer periphery of the terminal accommodating portion 21. Further, the drain plate 27 is inclined downwardly from the lower edge of the escape hole 25 and connected to the outer periphery of the terminal accommodating portion 21. Thus, water or any other liquid can be drained from the escape hole 25 to an outer peripheral side of the terminal accommodating portion 21 along the upper surface of the drain plate 27.

Figure 6:
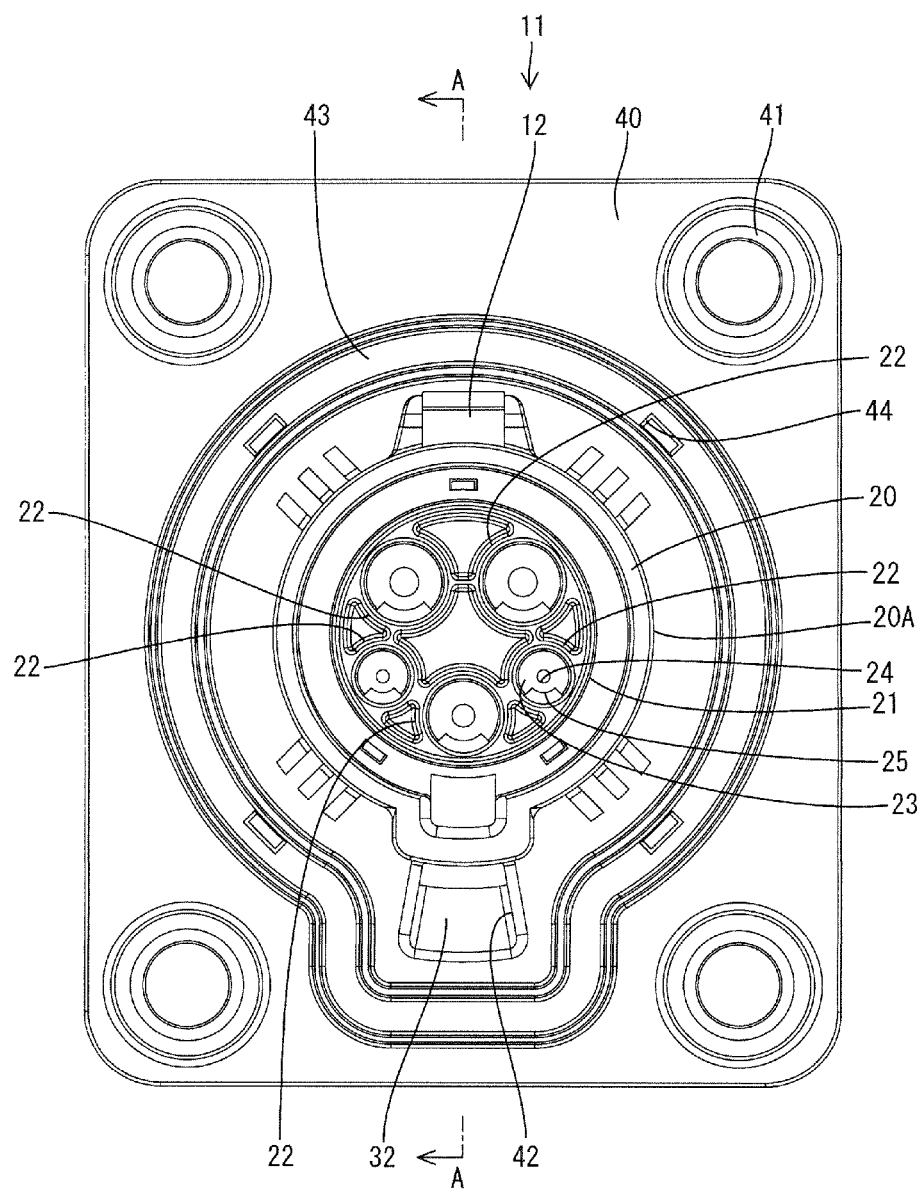
FIG. 6 is a front view of a housing.

As shown in FIG. 6, the mounting plate 40 bulges out radially outwardly from the outer peripheral surface of the inner tube 20 and has a substantially rectangular outer shape. Specifically, metal collars 41 are press-fit on respective (e.g. four) corners of the mounting plate 40. Both inner and outer ends of the collars 41 project from surfaces of the mounting plate 40. Thus, when the housing 11 is fixed (particularly bolted or riveted) to the outer panel P, the collars 41 are brought into direct contact with the outer panel P and the housing 11 is firmly fixed to the outer panel P.

Figure 12:
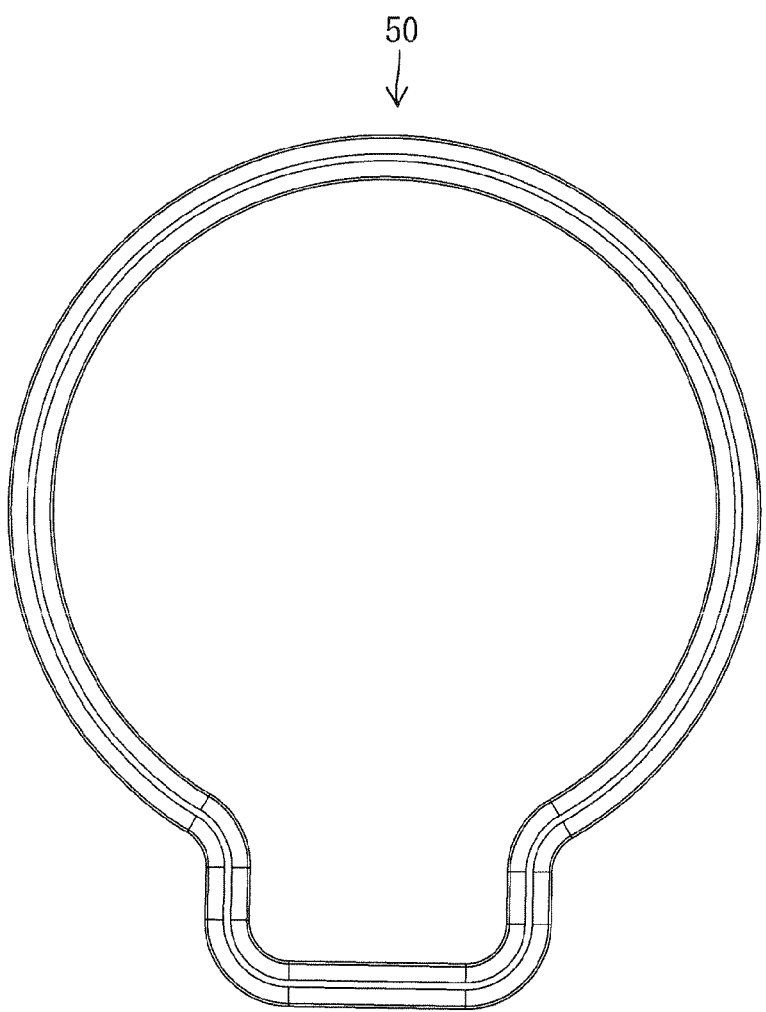
FIG. 12 is a front view of a rubber ring.

At least one drain port 42 is formed to penetrate through the mounting plate 40 substantially below the inner tube portion 20. A mounting groove 43 which at least partly surrounds the inner tube 20 and the drain port 42 together is formed by recessing the front surface of the mounting plate 40. This mounting groove 43 is shaped to extend down while circumventing the drain port 42. In conformity with this, the rubber ring 50 is shaped that a lower end portion extends down as shown in FIG. 12.

Figure 13:
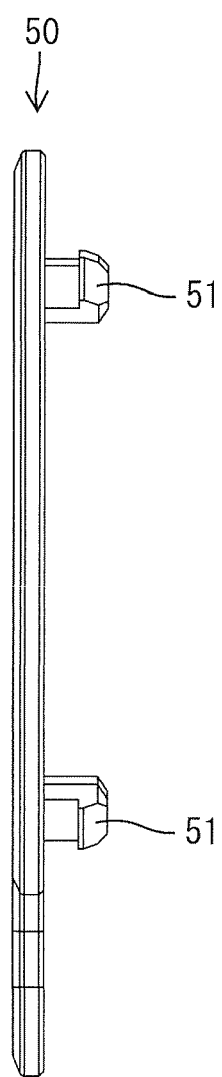
FIG. 13 is a side view of the rubber ring.

The rubber ring 50 made of a resilient material such as rubber is mounted into the mounting groove 43. As shown in FIG. 6, insertion holes 44 are formed in the bottom surface of the mounting groove 43 while being circumferentially spaced apart. Insertion pieces 51 provided on the rubber ring 50 as shown in FIG. 13 are to be inserted into these insertion holes 44 so that the rubber ring 50 is held and retained in the mounting groove 43.

The terminal fitting 60 is formed by press-working (particularly bending, folding and/or embossing) an electrically conductive flat metal plate and, as shown in FIG. 1 or 5, includes the terminal connecting portion 61 substantially in the form of a round bar, a wire connecting portion 62 behind the terminal connecting portion 61, and a front stop 63 formed between the terminal connecting portion 61 and the wire connecting portion 62. The terminal connecting portion 61 substantially matches the terminal insertion hole 24 in the cylindrical portion 22 and is insertable therein. The front stop 63 comes into contact with the partition wall 23 from behind to stop the terminal fitting 60 at its proper front end position. The wire connecting portion 62 has a cylindrical shape with an open rear end and is to be crimped, bent or folded into connection a core exposed at an end of a wire W (such as by hexagonal crimping).

Figure 18:
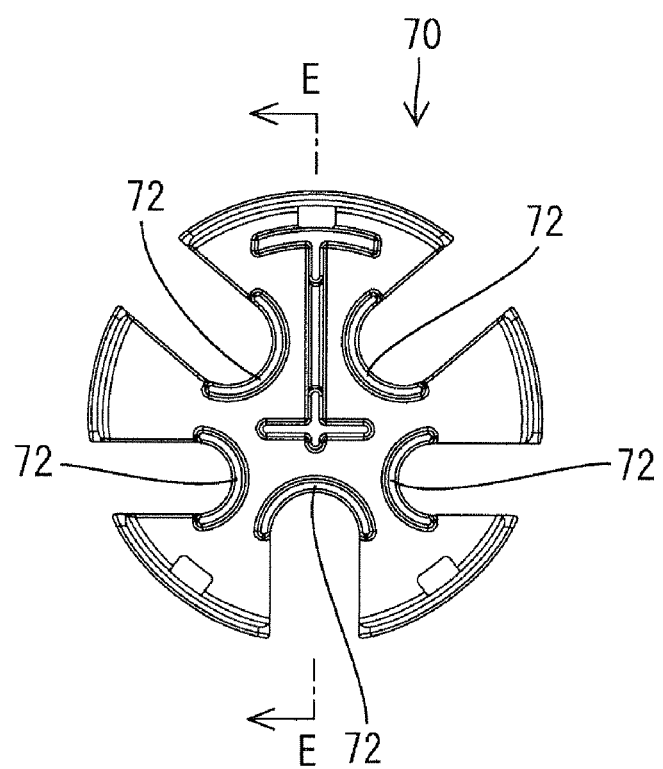
FIG. 18 is a front view of a retainer.
Figure 19:
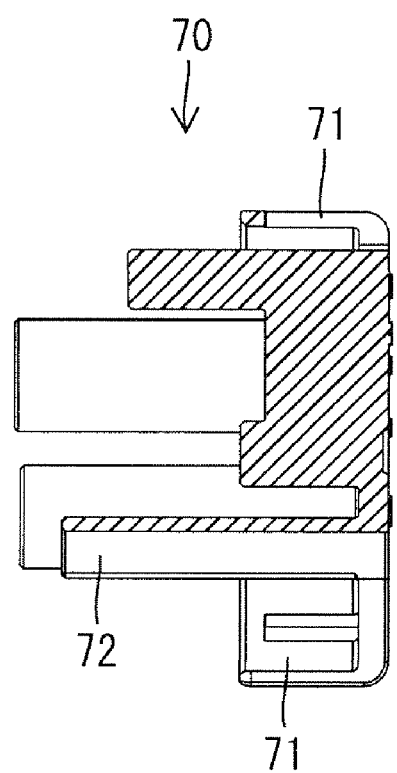
FIG. 19 is a section along E-E of FIG. 18.
Figure 20:
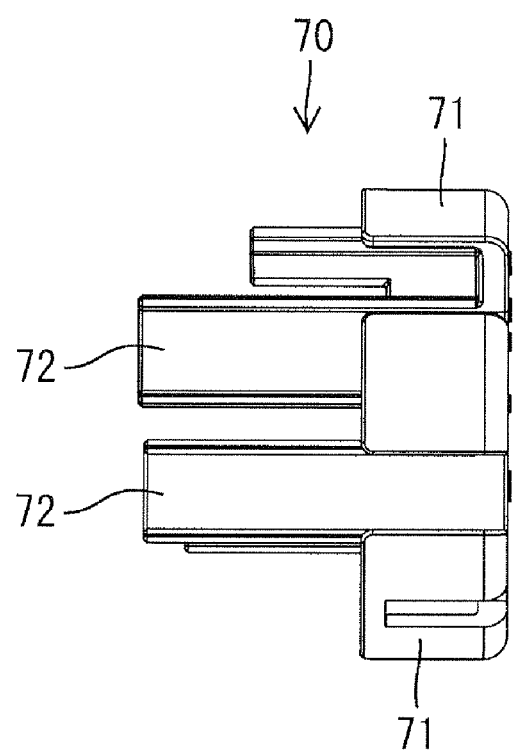
FIG. 20 is a side view of the retainer.

Retaining projections 26 are provided on the outer peripheral surface of the inner tube 20. On the other hand, as shown in FIGS. 18 to 20, retaining pieces 71 engageable with the respective retaining projections 26 in forward and backward directions FBD are provided on the peripheral wall of the retainer 70. Further, the retainer 70 includes contact portions 72 that are to be inserted into the cylindrical portions 22 to be brought into contact with the front stops 63 from behind. In this way, the retainer 70 is fixed to the inner tube 20 and the respective terminal fittings 60 are retained so as not to come out e.g. backward by the respective contact portions 72 in a state where the retaining pieces 71 are engaged with the retaining projections 26.

Figure 8:
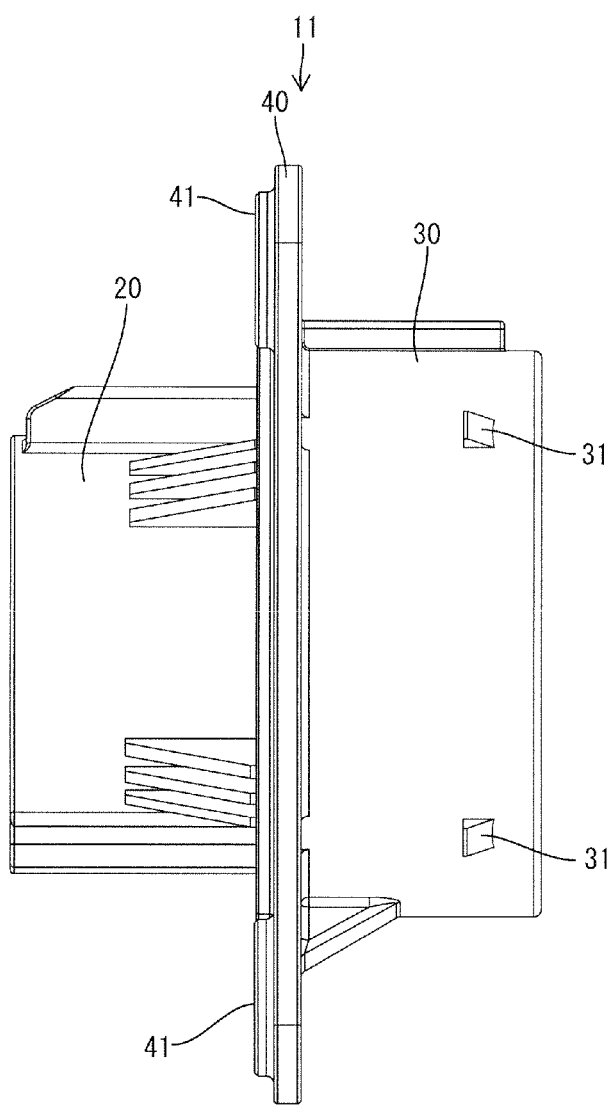
FIG. 8 is a side view of the housing.

The outer tube 30 has a substantially cylindrical outer shape one size larger than the inner tube 20 and is arranged coaxially with the inner tube 20. The rear end of the outer tube 30 is located behind that of the inner tube 20. As shown in FIG. 8, locking projections 31 are provided on the outer peripheral surface of the outer tube 30. On the other hand, as shown in FIG. 7, at least one drain channel 32 connected to the drain port 42 is provided at the inner lower surface of the outer tube 30. The drain channel 32 has such a tapered shape as to be enlarged downwardly toward the mounting plate 40.

Figure 10:
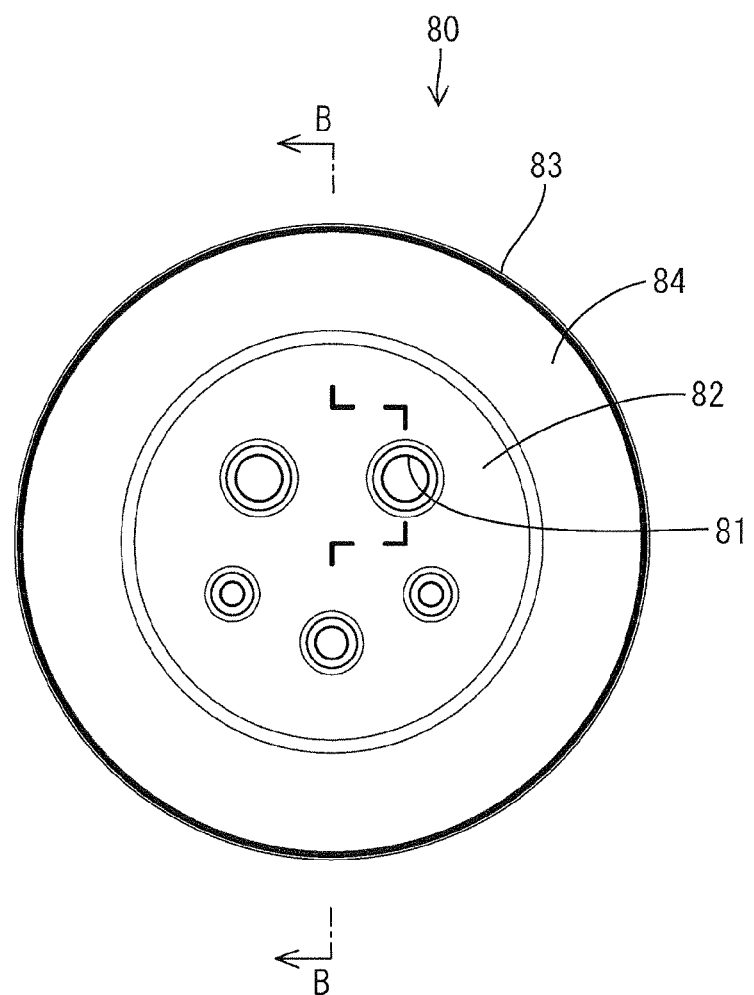
FIG. 10 is a front view of a rubber plug.
Figure 11:
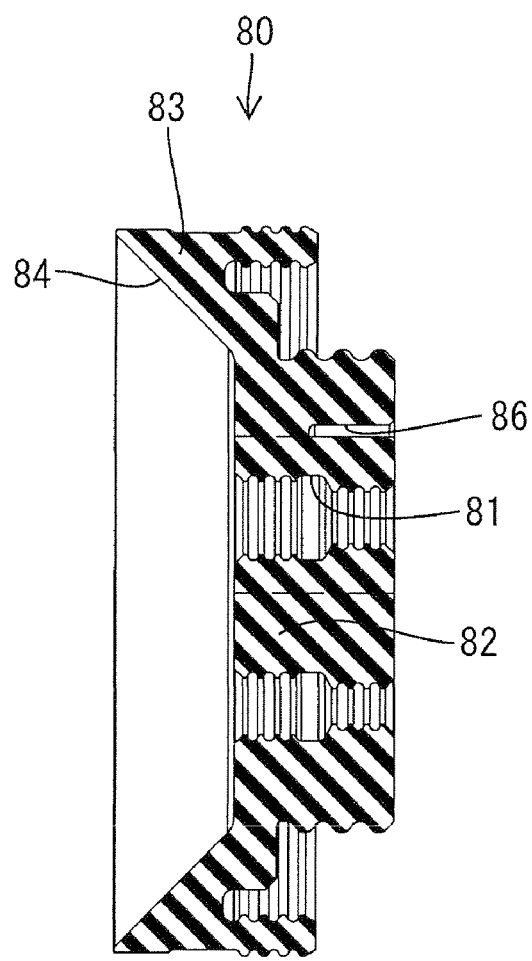
FIG. 11 is a section along B-B of FIG. 10.

The rubber plug 80 is made of a resilient material such as rubber and, as shown in FIGS. 10 and 11, includes a base plate 82 formed with large and small seal holes 81 through which large and small wires W are to be inserted in a sealed state. A tapered peripheral wall 83 standing from the peripheral edge of the base plate 82.

As shown in FIG. 11, each seal hole 81 penetrates through the base plate 82 substantially in forward and backward directions FBD (plate thickness direction) and comprises a large-diameter hole arranged at a front side and a small-diameter hole arranged at a rear side. The wire connecting portion 62 of the terminal fitting 60 is to be accommodated in a sealed state in the large-diameter hole of the seal hole 81 and the wire W is accommodated in a sealed state in the small-diameter hole of the seal hole 81. Note that annular lips are provided circumferentially in the seal hole 81, and the lips are squeezed over substantially the entire circumference by the wire connecting portion 62 and the wire W to fulfill a sealing function.

The front surface of the peripheral wall 83 comprises an inclined surface 84 extending radially outwardly toward the front side. This inclined surface 84 has a substantially truncated conical shape over the entire circumference and, as shown in FIG. 5, is connected to the drain channel 32 of the outer tube 30 in a state where the rubber plug 80 is mounted in the housing 11. That is, the rubber plug 80 is so mounted into the housing 11 that the rear end of the drain channel 32 connects to the front end of the inclined surface 84. Note that an angle of inclination of the inclined surface 84 particularly is somewhat larger than that of the drain channel 32.

As shown in FIG. 11, annular lips are provided circumferentially on the outer peripheral surface of the peripheral wall 83. These lips are squeezed over the entire circumference by the inner peripheral surface of the outer tube 30, as shown in FIG. 5, to fulfill a sealing function. In this way, a sealed space 33 is formed in the outer tube 30. This sealed space 33 is formed by the inner peripheral surface of the outer tube 30, the outer peripheral surface of the inner tube 20, the inclined surface 84 of the rubber plug 80 and the like. Since the sealed space 33 communicates with the atmosphere through the drain port 42, the internal pressure of the sealed space 33 can be made substantially equal to an atmospheric pressure. Note that a mold removal hole 45 left in forming the lock 12 is formed above the inner tube 20 in the mounting plate 40, and the sealed space 33 communicates with the atmosphere also by this mold removal hole 45.

A positioning hole 86 is formed in the rear surface of the peripheral wall 83 as shown in FIG. 11. As shown in FIG. 5, at least one positioning projection 94 provided on the plug holder (rubber plug presser) 90 is press-fit into the positioning hole 86. Further, forward and backward movements of the rubber plug 80 are prevented by mounting the base plate 82 between the retainer 70 and the rubber plug presser 90 in forward and backward directions FBD substantially without forming any clearance.

Figure 14:
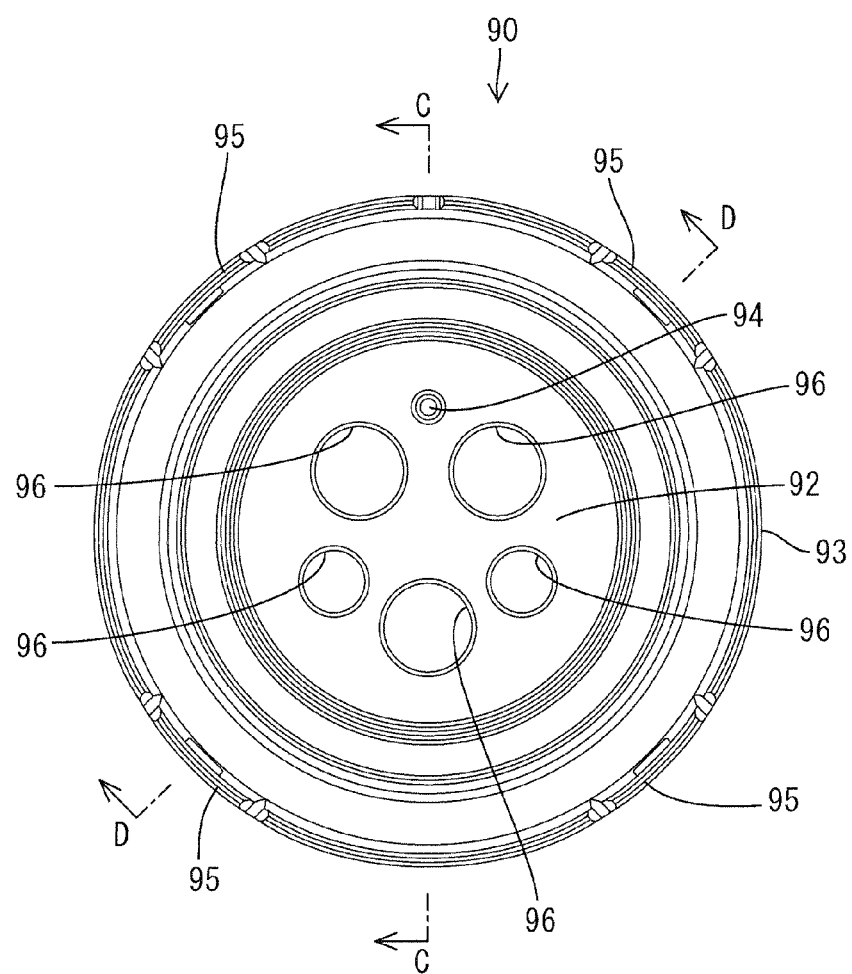
FIG. 14 is a front view of a rubber plug presser.
Figure 15:
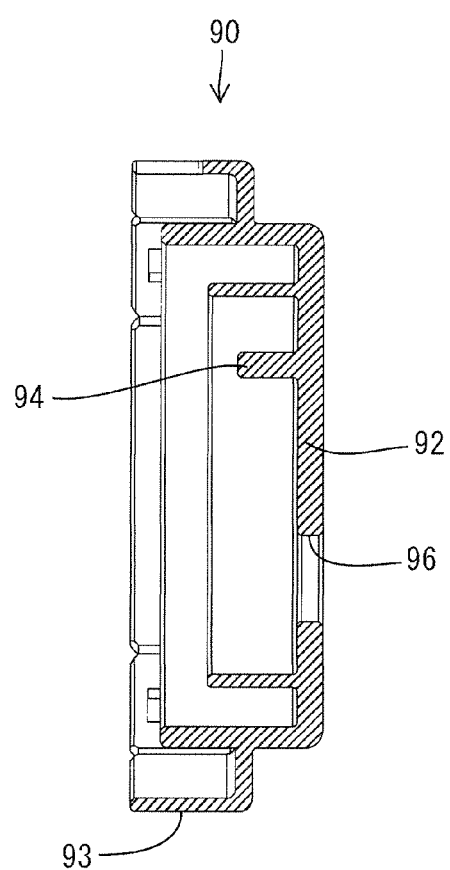
FIG. 15 is a section along C-C of FIG. 14.

The rubber plug presser 90 is made e.g. of synthetic resin and, as shown in FIG. 14, includes a pressing portion 92 formed with large and small wire insertion holes 96 and an outer wall 93 projecting from the peripheral edge of the pressing portion 92. The wire insertion holes 96 are arranged to correspond to the respective seal holes 81 of the rubber plug 80 and the wires W pulled out backward from the respective seal holes 81 can be inserted through the wire insertion holes 96. Note that the positioning projection 94 for positioning the rubber plug 80 in a circumferential direction is provided on the front surface of the pressing portion 92. This positioning projection 94 is press-fit into the positioning hole 96 formed in the rear surface of the base plate 82 of the rubber plug 80.

Figure 16:
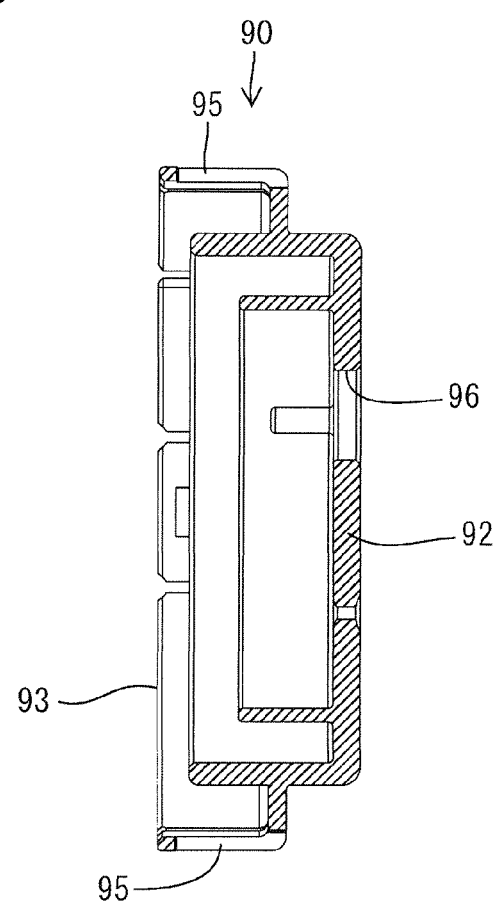
FIG. 16 is a section along D-D of FIG. 14.
Figure 17:
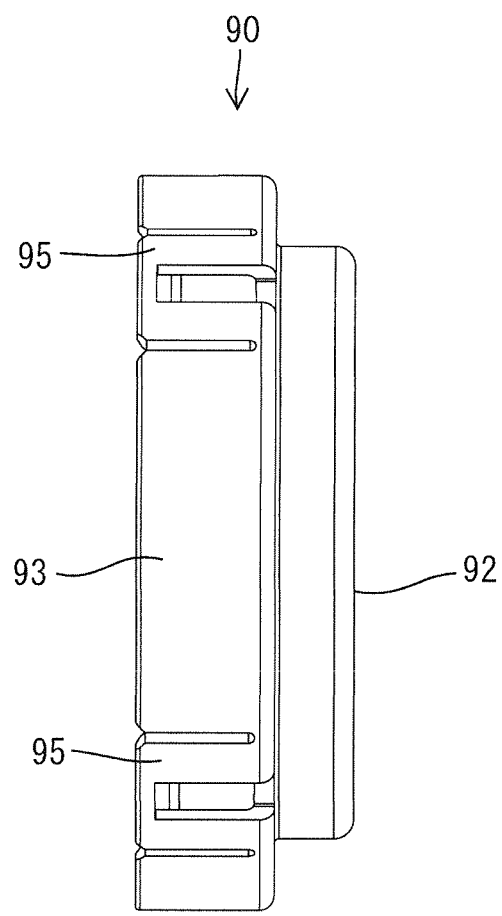
FIG. 17 is a side view of the rubber plug presser.

As shown in FIGS. 16 and 17 locking pieces 95 are provided on the outer wall 93. These locking pieces 95 are to be engaged with the corresponding locking projections 31 of the outer tube 30 in forward and backward directions FBD when the rubber plug presser 90 is mounted into or to the housing 11. In this way, the rubber plug presser 90 is held or positioned at the rear end opening of the outer tube 30 and the rubber plug 80 is held and retained in the outer tube 30 in a slightly compressed state.

Figure 3:
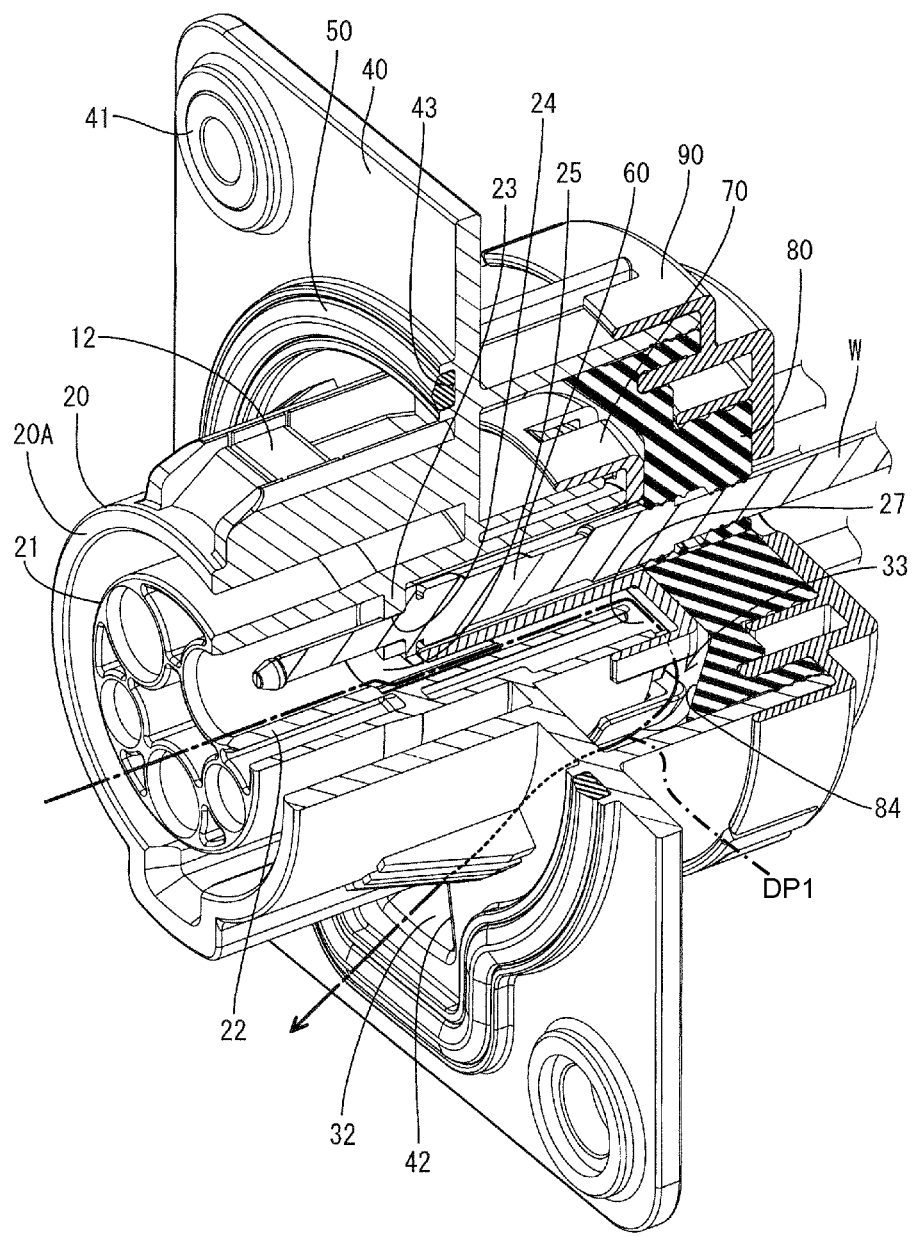
FIG. 3 is a perspective view party in section showing an example of a drainage structure via drain plates.

A drainage structure in the sealed space 33 is described with reference to FIGS. 3 and 4. First, as shown in FIG. 3, if water or any other fluid or liquid enters (any of) a pair of left and right larger cylindrical portions 22 arranged in an upper part in the terminal accommodating portion 21, this water enters the sealed space 33 through the escape holes 25 of the partition walls 23. The water having entered the sealed space 33 is guided obliquely down toward the outer periphery of the terminal accommodating portion 21 via the drain plates 27 and brought to the drain channel 32 along the inclined surface 84 of the rubber plug 80. The water brought to the drain channel 32 is drained to the outside of the vehicle through the drain port 42. Accordingly, the water or other liquid can be drained through this drain or drainage path DP1.

Figure 4:
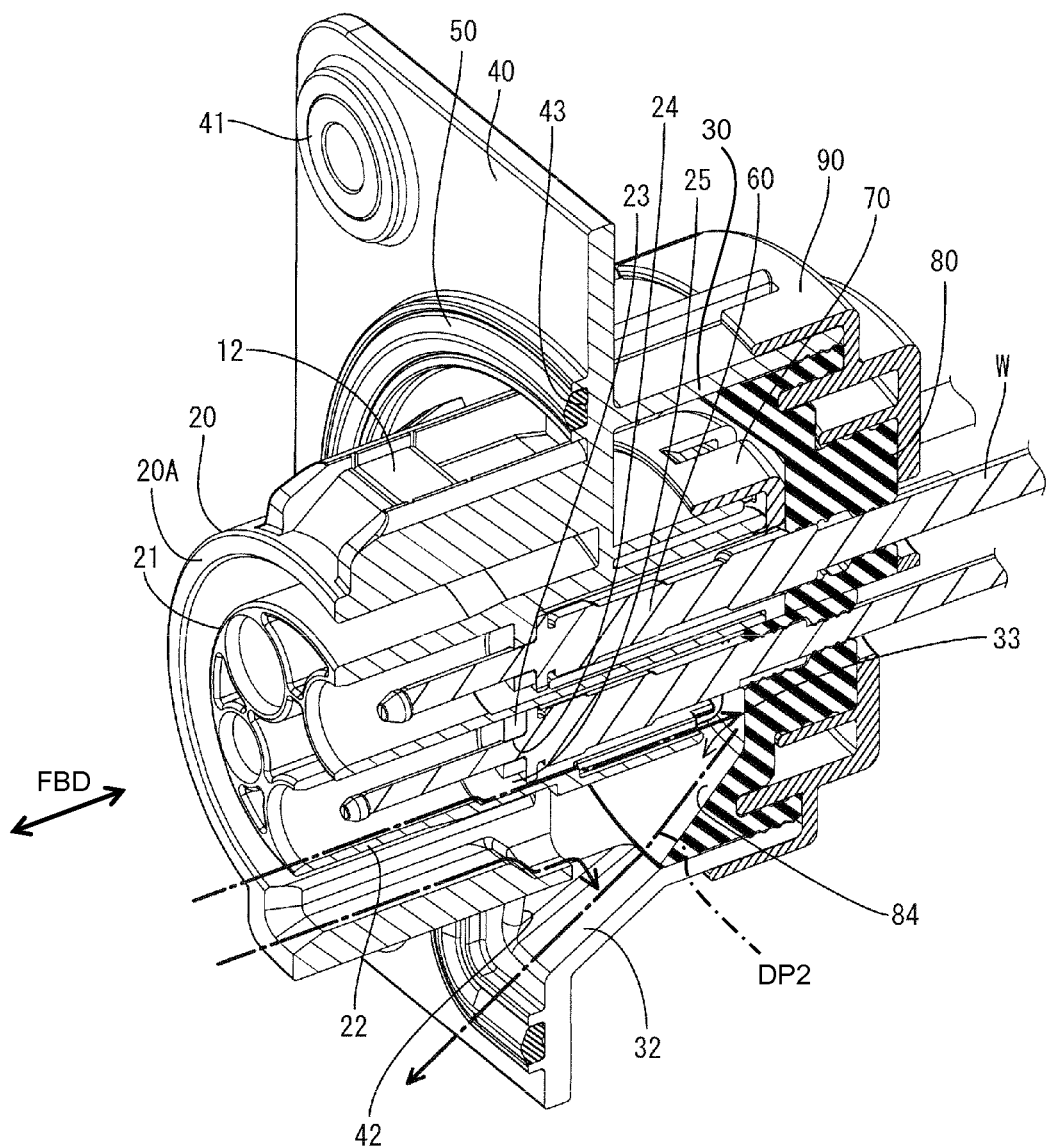
FIG. 4 is a perspective view party in section showing an example of a drainage structure without via the drain plates.
Figure 5:
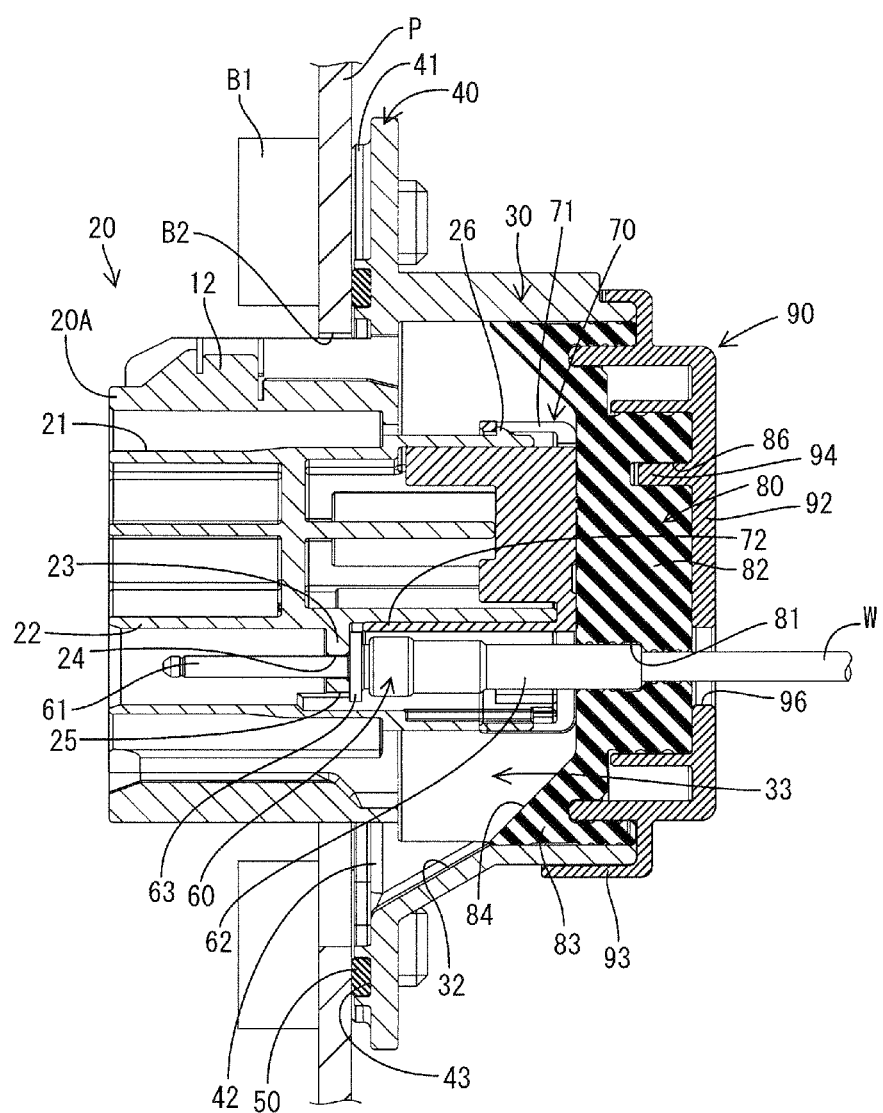
FIG. 5 is a section showing the internal structure of the vehicle-side connector fixed to an outer panel when viewed sideways.

Next, if water or any other fluid or liquid enters the larger cylindrical portion 22 e.g. arranged in a lower central part in the terminal accommodating portion 21 as shown in FIG. 4, this water enters the sealed space 33 through the escape hole 25 of the partition wall 23. The water having entered the sealed space 33 flows downwardly along the inclined surface 84 of the rubber plug 80 and drained to the outside of the vehicle through the drain port 42. Thus, the water or other liquid can be drained through this drain or drainage path DP2. Accordingly, the water having entered the sealed space 33 does not penetrate to a vehicle inner side of the outer panel P (inside of the vehicle) and is reliably drained to the outside of the vehicle. Thus, it can be prevented that devices such as a battery installed in the vehicle are wetted. Further, since the sealed space 33 communicates with the atmosphere through the drain port 42 and the internal pressure of the sealed space 33 is equal to the atmospheric pressure, there is no possibility of the reverse flow of the water into the sealed space 33 and the like.

In assembling the vehicle-side connector 10, the wire connecting portions 62 of the terminal fittings 60 are crimped, bent or folded into connection with the cores of the wires W and the terminal fittings 60 are inserted into the cylindrical portions 22 from behind. Then, the front stops 63 of the terminal fittings 60 contact the partition walls 23 from behind so that the terminal fittings 60 are positioned or stopped at their proper front end positions. Thereafter, the retainer 70 is mounted into or to (particularly the rear end opening of) the terminal accommodating portion 21 from behind. In mounting the retainer 70, the contact portions 72 are inserted into the cylindrical portions 22 from behind and brought into contact with the rear surfaces of the front stop portions 63. Simultaneously with this, the retaining pieces 71 are engaged with the retaining projections 26 so that the retainer 70 is held at the rear end opening of the terminal accommodating portion 21. In this way, the terminal fittings 60 are held and retained in the cylindrical portions 22. Subsequently, the rubber plug 80 mounted on the wires W in advance is mounted into the outer tube 30 from behind and the rubber plug presser 90 is mounted into or to the rear end opening of the outer tube 30. In this way, the rubber plug 80 is held in the outer tube 30 to form the sealed space 33.

In charging the battery of the vehicle, the charging connector is or can be connected to the vehicle-side connector 10. At this time, a small connecting force is sufficient since the air in the sealed space 33 escapes to the outside of the vehicle through the drain port 42. Rainwater may splash on the vehicle-side connector 10 at the time of charging and/or an electrically conductive liquid may splash on the vehicle-side connector 10 at the time of washing the vehicle. In such cases, it is necessary to quickly drain liquid, rainwater or the like having splashed on the vehicle-side connector 10 to the outside of the vehicle.

Accordingly, water pooled or entered in the cylindrical portions 22 is drained into the sealed space 33 through the escape holes 25 and the water in the sealed space 33 is brought to the drain port 42, for example, by two drain paths DP1, DP2 and drained to the outside of the vehicle from the drain port 42. The first drain path DP1 particularly is a path passing the escape holes 25, the drain plates 27, the drain channel 32 and the like. The second drain path DP2 particularly is a path passing the escape holes 25, the inclined surface 84, the drain channel 32 and the like. In this way, the water or any other liquid in the cylindrical portions 22 is quickly discharged to the outside of the vehicle.

As described above, in this embodiment, the outer tube 30 is provided at the vehicle inner side of the mounting plate 40 and the rubber plug 80 is mounted into or to the rear end opening of this outer tube 30 to form the sealed space 33 in the outer tube 30 and water having entered the sealed space 33 can be drained to the outside of the vehicle along the inclined surface 84 of the rubber plug 80 and the drain channel 32. Further, the reverse flow of water from the drain port 42 into the sealed space 33 can be avoided. In this way, the entrance of water into the inside of the vehicle can be avoided and water in the sealed space 33 can be reliably drained to the outside of the vehicle through the drain port 42.

Further, since the base plate 82 of the rubber plug 80 is arranged between the retainer 70 and the pressing portion 92 of the rubber plug presser 90, the rubber plug 80 can be held reliably without moving in forward and backward directions FBD.

The present invention is not limited to the above described and illustrated embodiment. For example, the following embodiments are also included in the technical scope of the present invention.

Although a water guide portion is formed by the inclined surface 84 of the rubber plug 80 and the drain channel 32 of the outer tube portion 30 in the above embodiment, it may be formed only by the drain channel of the outer tube portion according to the present invention.

Although the terminal fittings 60 are retained only by the retainer 70 in the above embodiment, one or more locking lances may be formed in the respective cylindrical portions 22 and the terminal fittings 60 may be retained by the terminal fittings 60 according to the present invention.

The outer tube 30 is formed integrally or unitarily to the mounting plate 40 in the above embodiment. However, the outer tube and the mounting plate may be formed separately and connected in a sealed state by a seal ring according to the invention. Further, although the inner tube 20 is formed integrally or unitarily to the mounting plate 40 in the above embodiment, the inner tube and the mounting plate may be formed separately and connected in a sealed state by a seal ring according to the invention.

What is claimed is:

1. A vehicle-side connector to be connected to a charging connector at the time of charging, comprising:
    a mounting plate which is to be fixed to a body part of a vehicle;
    a first tube rovided at the mounting plate and penetrating through the mounting plate;
    a second tube projecting from the mounting plate toward the inside of the vehicle and having an open projecting end;
    a resilient plug forming a sealed space in the second tube by sealing between a wire pulled into the inside of the vehicle from the interior of the first tube and an opening of the second tube;
    a plug holder mounted to the second tube to retain the resilient plug;
    at least one fluid guide provided in the sealed space and inclined down toward the outside of the vehicle; and
    at least one drain port penetrating though the mounting plate for draining fluid from the fluid guide to the outside of the vehicle.

2. The vehicle-side connector of claim 1, wherein the second tube surrounds an outer periphery of the first tube over an entire circumference.

3. The vehicle-side connector of claim 2, wherein the plug holder is mounted in the opening of the second tube to retain the resilient plug.

4. The vehicle-side connector of claim 1, further comprising:
    at least one terminal fitting connected to an end of the wire and accommodated in the first tube; and
    a retainer mounted in an opening of the first tube to retain the terminal fitting.

5. The vehicle-side connector of claim 4, wherein the resilient plug includes a base plate formed with at least one seal hole through which the wire is inserted in a sealed state.

6. The vehicle-side connector of claim 5, wherein the resilient plug includes a tapered peripheral wall standing from a peripheral edge of the base plate.

7. The vehicle-side connector of claim 6, wherein the fluid guide is provided from the peripheral wall to the second tube.

8. The vehicle-side connector of claim 7, wherein forward and backward movements of the resilient plug are prevented by mounting the base plate between the retainer and the plug holder in forward and backward directions substantially without forming any clearance.

9. The vehicle-side connector of claim 1, wherein the fluid guide comprises a portion having a tapered shape as to be enlarged down toward the mounting plate.

10. The vehicle-side connector of claim 1, wherein fluid having entered a portion of the first tube and reached the sealed space is guided obliquely down via one or more drain plates and brought to a drain channel along an inclined surface of the resilient plug and then drained to the outside of the vehicle through the drain port.

* * * * *